US012639563B2

(12) United States Patent
Buckley et al.

(10) Patent No.: US 12,639,563 B2
(45) Date of Patent: May 26, 2026

(54) SUPERCONDUCTING OPTO-ELECTRONIC TRANSMITTER CIRCUIT

(71) Applicant: Government of the United States of America, as represented by the Secretary of Commerce, Gaithersburg, MD (US)

(72) Inventors: Sonia Mary Buckley, Boulder, CO (US); Adam Nykoruk McCaughan, Denver, CO (US); Jeffrey Michael Shainline, Boulder, CO (US)

(73) Assignee: GOVERNMENT OF THE UNITED STATES OF AMERICA, AS REPRESENTED BY THE SECRETARY OF COMMERCE, Gaithersburg, MD (US)

( * ) Notice: Subject to any disclaimer, the term of this patent is extended or adjusted under 35 U.S.C. 154(b) by 546 days.

(21) Appl. No.: 18/203,845

(22) Filed: May 31, 2023

(65) Prior Publication Data

US 2024/0403622 A1     Dec. 5, 2024

(51) Int. Cl.
*G06N 3/067* (2006.01)
*H05B 45/32* (2020.01)

(52) U.S. Cl.
CPC .......... *G06N 3/0675* (2013.01); *H05B 45/32* (2020.01)

(58) Field of Classification Search
None
See application file for complete search history.

(56) References Cited

U.S. PATENT DOCUMENTS

| | | | |
|---|---|---|---|
| 10,236,433 B1 | 3/2019 | Mccaughan et al. | |
| 10,963,776 B2 * | 3/2021 | Mulaosmanovic | .... G06N 3/049 |
| 11,258,415 B2 | 2/2022 | Shainline et al. | |
| 11,468,000 B2 * | 10/2022 | Shainline | ............... G06N 3/067 |
| 11,636,326 B2 * | 4/2023 | Gosson | .................. G06N 3/049 |
| | | | 706/38 |

(Continued)

OTHER PUBLICATIONS

Shainline, J.M., et al., "Circuit designs for superconducting optoelectronic loop neurons", Journal of Applied Physics, 2018, p. 152130, vol. 124.

(Continued)

*Primary Examiner* — Tyler W. Sullivan

(74) *Attorney, Agent, or Firm* — Office of Chief Counsel for National Institute of Standards and Technology

(57) ABSTRACT

Embodiments of the present invention related to a neuro-mimetic circuit including a transmitter circuit to receive the threshold signal from a superconducting optoelectronic neuron and convert the small current pulse to a voltage pulse sufficient to produce light from a semiconductor diode. This light is the signal used to communicate between neurons in the network. The transmitter circuit in accordance with the present invention includes an amplifier chain that comprises two Josephson junctions, a superconducting thin-film current-gated current amplifier, and a superconducting thin-film current-gated voltage amplifier. The transmitter circuit in accordance with the present invention enable an amplification sequence that allows neuronal firing of about 20 MHz with power density sufficiently low to be cooled with standard $^{4}$He cryogenic systems operating at 4.2 K.

27 Claims, 7 Drawing Sheets

(56) References Cited

U.S. PATENT DOCUMENTS

| 2022/0358353 A1* | 11/2022 | Bozbey | .............. H03K 19/1952 |
| 2025/0078881 A1* | 3/2025 | Huang | ................... G06F 17/16 |

OTHER PUBLICATIONS

Shainline, J.M., et al., "Superconducting optoelectronic loop neurons", Journal of Applied Physics, 2019, p. 044902, vol. 126.

Buckley, S., et al., "All-silicon light-emitting diodes waveguide-integrated with superconducting single-photon detectors", Applied Physics Letters, 2017, p. 141101, vol. 111.

Mccaughan, A.N., et al., "A superconducting thermal switch with ultrahigh impedance for interfacing superconductors to semiconductors", Nature Electronics, 2019, p. 451-456, vol. 2.

Mccaughan, A.N., et al., "A Superconducting-Nanowire Three-Terminal Electrothermal Device", Nano Letters, 2014, p. 5748-5753, vol. 14.

Ravindran, P., et al., "Active quenching of superconducting nanowire single photon detectors", Optics Express, 2020, p. 4099-4114, vol. 28 No. 3.

* cited by examiner

100

102

104

SUPERCONDUCTING OPTO-ELECTRONIC TRANSMITTER CIRCUIT

STATEMENT REGARDING FEDERAL RIGHTS

The invention described herein was made with United States Government support from the National Institute of Standards and Technology (NIST), an agency of the United States Department of Commerce. The United States Government has certain rights in the invention.

FIELD OF THE INVENTION

The present invention relates generally to neuromimetic networks, and more particularly, to a superconducting-semiconducting opto-electronic transmitter circuit.

BACKGROUND OF THE INVENTION

Large-scale neural system must achieve suitable communication and power efficiency. Optical signals are best suited for communication and superconducting detectors enable power efficiency. A challenge in designing superconducting optoelectronic hardware is to generate optical signals at telecommunication wavelengths with superconducting electronic circuits. The superconducting energy gap is in the millivolt range, making it difficult for superconducting circuits to produce the one volt needed to appreciably alter the carrier concentrations in semiconductor electronic and optoelectronic devices. This voltage mismatch makes it difficult for superconducting electronic circuits to interface with complimentary metal-oxide semiconductor (CMOS) logic and memory.

In a typical superconducting optoelectronic neuron, photons from afferent neurons are received by single-photon detectors (SPDs) at a neuron's synapses and, using Josephson circuits, these detection signals are converted into an integrated supercurrent that is stored in a superconducting loop. The amount of current added to the integration loop during a synaptic photon detection event is determined by the synaptic weight. The synaptic weight is dynamically adjusted by another circuit combining SPDs and Josephson junctions (JJ). Despite this addition of current, a superconducting optoelectronic neuron will only produce a small voltage pulse upon reaching threshold. When the integrated current from all the synapses of a given neuron reaches a threshold, an amplification of the integrated current to a voltage of about one volt is needed to produce light from a semiconductor light source. Accordingly, there is a need for a transmitter circuit to receive the threshold current signal and convert the current pulse to a voltage pulse sufficient to produce light from a semiconductor diode.

SUMMARY OF THE INVENTION

Embodiments of the present invention provide neuromimetic circuit including a transmitter circuit to receive the threshold signal from a superconducting optoelectronic neuron and convert the current pulse to a voltage pulse sufficient to produce light from a semiconductor diode. This light is the signal used to communicate between neurons in the network. The transmitter circuit in accordance with the present invention includes an amplifier chain that comprises a thresholding element for detecting whether a neuronal integration loop has reached a threshold value and generating an output current pulse when a threshold current is reached in the neuronal integration loop, a superconducting-semiconducting assembly for converting a current-biased superconducting element into a voltage source and for resetting the circuit, and a semiconductor element for producing a current in response to a voltage generated by the voltage source, and a semiconductor light source, wherein the current generated by the semiconductor element drives the semiconductor light source. In an exemplary embodiment, the transmitter circuit in accordance with the present invention enables an amplification sequence that allows neuronal firing of about 20 MHz with power density sufficiently low to be cooled with standard $^4$He cryogenic systems operating at 4.2 K.

Accordingly, embodiments of the present invention relate to a neuromimetic circuit including a neuronal integration loop including a plurality of synaptic integration loops, wherein the plurality of the synaptic integration loops comprises a combined plurality of electrical signals generated during a plurality of synaptic firing events in a plurality of synapses, wherein the neuronal integration loop induces an integrated current pulse; a transmitter circuit for generating a photonic pulse, wherein the transmitter circuit comprises a superconducting thresholding element for detecting a threshold value of the induced integrated current pulse in the neuronal integration loop, wherein the superconducting thresholding element generates a first current pulse at the threshold value of the integrated current pulse; superconducting-semiconducting assembly for switching a superconducting element from a superconducting state to a normal metal state, wherein a first biasing current through the switched superconducting element in the normal metal state induces a first voltage; a semiconductor element including a plurality of transistors for inducing a second voltage, wherein the first voltage induced by the switched superconducting element switches off at least one of the plurality of the transistors, wherein the switched off at least one of the plurality of the transistors induces the second voltage; a semiconductor light source drive element to drive a light source to generate the photonic pulse, wherein the induced second voltage from the switched off at least one of the plurality of the transistors drives the semiconductor light source drive element, wherein the neuronal integration loop generating the integrated current pulse initiates an amplification cascade in the transmitter circuit. In one embodiment of the present invention, the superconducting element is a superconducting wire.

In one aspect of the present invention, the superconducting-semiconducting assembly comprises a cryotron switching element for switching the superconducting element from the superconducting state to the normal metal state, wherein the superconducting element is resistive in the normal metal state, wherein the resistive superconducting element generates a voltage to drive the light source drive element, wherein the first current pulse generated in the superconducting thresholding element switches the cryotron switching element to the normal metal state. In one embodiment, the cryotron switching element is a heater cryotron (hTron) switching element. In another embodiment, the cryotron switching element is a nano cryotron (nTron) switching element.

In some embodiment of the present invention, the superconducting thresholding element further comprises a Josephson junction for adding current to the neuronal integration loop until the integrated current pulse reaches the threshold value.

In other embodiments of the present invention, the neuromimetic circuit further includes a reset element for receiving a first portion of the first biasing current to reset the superconducting element to the superconducting state. In one embodiment, the reset element is a passive reset element. In another embodiment, the reset element is an active reset element.

In another embodiment of the present invention, the neuromimetic circuit further includes a capacitor for receiving a second portion of the first biasing current, wherein a second biasing current through the switched superconducting element in the normal metal state induces the first voltage.

In one embodiment of the present invention, the plurality of the first transistors are metal oxide semiconductor field effect transistors. More particularly, the plurality of the first transistors are complementary metal-oxide semiconductor (CMOS) transistors.

In another aspect of the present invention, the semiconductor light source drive element comprises a second transistor for receiving the second voltage and generating a second current pulse; and a light emitting diode for generating the photonic pulse, wherein the semiconductor light source receives the second current pulse to generate the photonic pulse. In one embodiment, the semiconductor light source is a light emitting diode.

Another embodiment of the present invention relates a neuromimetic circuit including a neuronal integration loop including a plurality of synaptic integration loops, wherein the plurality of the synaptic integration loops comprises a combined plurality of electrical signals generated during a plurality of synaptic firing events in a plurality of synapses, wherein the neuronal integration loop induces an integrated current pulse; a transmitter circuit for generating a photonic pulse, wherein the transmitter circuit comprises a Josephson junction for adding a first current pulse to the neuronal integration loop until the integrated current pulse reaches a threshold value; a cryotron gate element for detecting a threshold value of the induced integrated current pulse in the neuronal integration loop, wherein the cryotron gate element generates a second current pulse at the threshold value of the integrated current pulse; a cryotron switching element including a channel for receiving the second current pulse, wherein the receiving the second current pulse switches the cryotron switching element from a superconducting state to a first resistive state; a superconducting element for conducting a first biasing current, wherein the switched cryotron switching element in the first resistive state switches the superconducting element to a second resistive state, wherein conducting the first biasing current through the switched superconducting element in the second resistive state induces a first voltage; a semiconductor element including a plurality of transistors for inducing a second voltage, wherein the first voltage induced by the switched superconducting element switches off at least one of the plurality of transistors, wherein the switched off at least one of the plurality of transistors induces the second voltage; a semiconductor light source drive element for receiving the second voltage to generate a second current pulse, wherein the second current pulse drives a light source to generate the photonic pulse; and a reset element for receiving a first portion of the first biasing current to reset the superconducting element to the superconducting state, wherein the neuronal integration loop generating the integrated current pulse initiates an amplification cascade in the transmitter circuit. In one embodiment of the present invention, the cryotron switching element is a heater cryotron (hTron) switching element. In another embodiment of the present invention, the cryotron switching element is a nano cryotron (nTron) switching element.

In some embodiments of the present invention, the neuromimetic circuit further includes a capacitor for receiving a second portion of the first biasing current, wherein a second biasing current through the switched superconducting element in the normal metal state induces the first voltage.

In one embodiment of the present invention, the superconducting element is a superconducting wire. In another embodiment of the present invention, the plurality of transistors are complementary metal-oxide semiconductor (CMOS) transistors. In some embodiments of the present invention, the light source is a light emitting diode.

Embodiments of the present invention also relate to a neuromimetic circuit including a neuronal integration loop including a plurality of synaptic integration loops, wherein the plurality of the synaptic integration loops comprises a combined plurality of electrical signals generated during a plurality of synaptic firing events in a plurality of synapses, wherein the neuronal integration loop induces an integrated current pulse; a transmitter circuit for generating a photonic pulse, wherein the transmitter circuit comprises a Josephson junction for adding a first current pulse to the neuronal integration loop until the integrated current pulse reaches a threshold value; a heater cryotron gate element for detecting the threshold value of the induced integrated current pulse in the neuronal integration loop, wherein the heater cryotron gate element generates a second current pulse at the threshold value of the integrated current pulse; a cryotron switching element including a heater cryotron channel for receiving the second current pulse, wherein receiving the second current pulse switches the cryotron switching element from a superconducting state to a first resistive state; a superconducting element for conducting a first biasing current, wherein the switched cryotron switching element in the first resistive state switches the superconducting element to a second resistive state, wherein conducting the first biasing current through the switched superconducting element in the second resistive state induces a first voltage; a semiconductor element including a first transistor and a second transistor for inducing a second voltage, wherein the first voltage induced by the switched superconducting element switches off the first and the second transistors, wherein the switched off the first and the second transistors induce the second voltage; a third transistor for receiving the second voltage and generating a third current pulse; and a light emitting diode for receiving the third current pulse and generating the photonic pulse, wherein the neuronal integration loop generating the integrated current pulse initiates an amplification cascade in the transmitter circuit. In one embodiment of the present invention, the superconducting element is a superconducting wire. In another embodiment of the present invention, the first, the second and the third transistors are complementary metal-oxide semiconductor (CMOS) transistors. In one aspect of the present invention, the switched cryotron switching element in the first resistive state has an impedance of about 1 MΩ.

In some embodiments of the present invention, the neuromimetic circuit further includes a reset element for receiving a first portion of the first biasing current to reset the superconducting element to the superconducting state. In other embodiments of the present invention, the neuromimetic circuit further includes a capacitor for receiving a second portion of the first biasing current, wherein a second biasing current through the switched superconducting element in the normal metal state induces the first voltage.

DETAILED DESCRIPTION

While the making and using of various embodiments of the present invention are discussed in detail below, it should be appreciated that the present invention provides many applicable inventive concepts which can be embodied in a wide variety of specific contexts. The specific embodiments discussed herein are merely illustrative of specific ways to make and use the invention, and do not delimit the scope of the present invention. Reference will now be made to the drawings wherein like numerals refer to like elements throughout.

Figure 1:
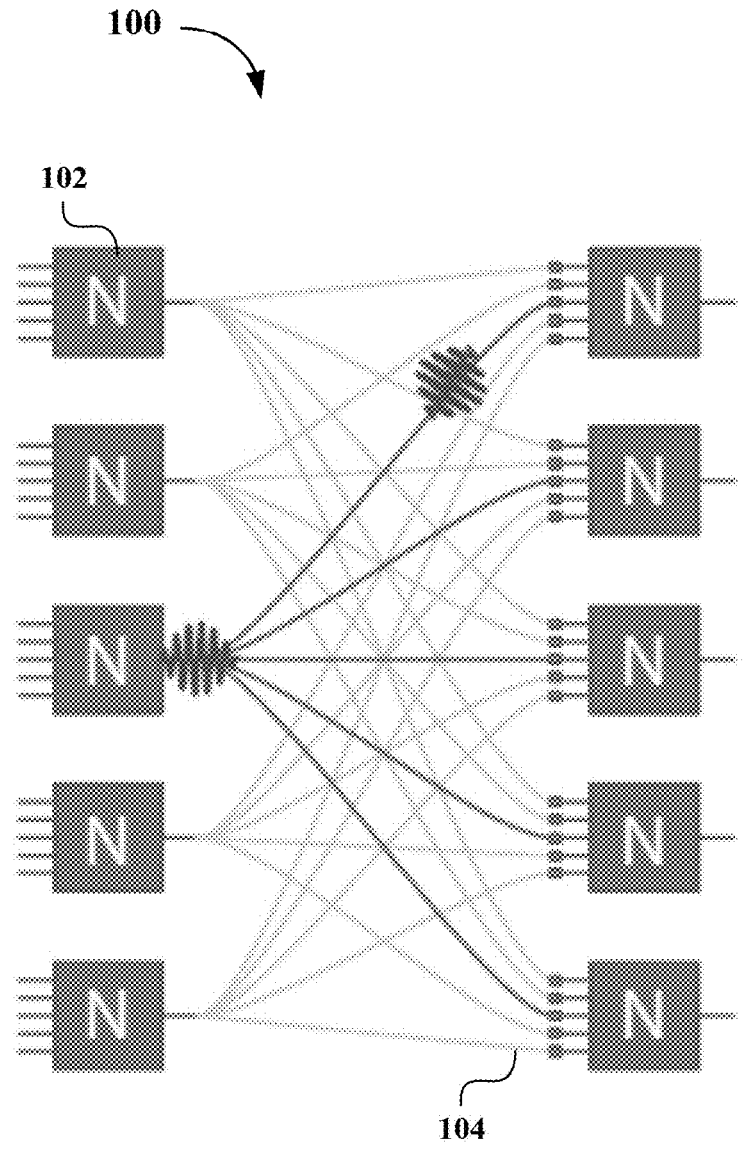
FIG. 1 illustrates an exemplary network of neurons connected by photonic waveguides.

FIG. 1 illustrates an exemplary network of neurons, generally designated as 100, in optical communication with each other by photonic waveguides. Information in neural systems, referred to as "spike encoded," is transmitted between interconnected neurons as optical signals. An individual neuron 102 (also referred to as a "processing unit" or "unit") will receive optical signals from several upstream neurons. Each neuron's input/output relation will be non-linear, and if the integrated upstream optical signals exceed a certain threshold, the neuron may itself fire optical signals to its downstream connections. These processing units are connected via a network of optical waveguides 104, as shown in FIG. 1. Superconducting optoelectronic circuits emulating neuronal responses ("neuronal spikes") use integrated light emitting diodes (LED) as transmitters with optical detectors as receivers. In one embodiment of the present invention, the optical detectors can be superconducting nanowire single photon detectors (SNSPD). In another embodiment of the present invention, the optical detectors can be semiconductor-based photodetectors. A network of optical waveguides 104 distribute neuronal spikes to enable a fanout of photonic pulses.

Figure 2:
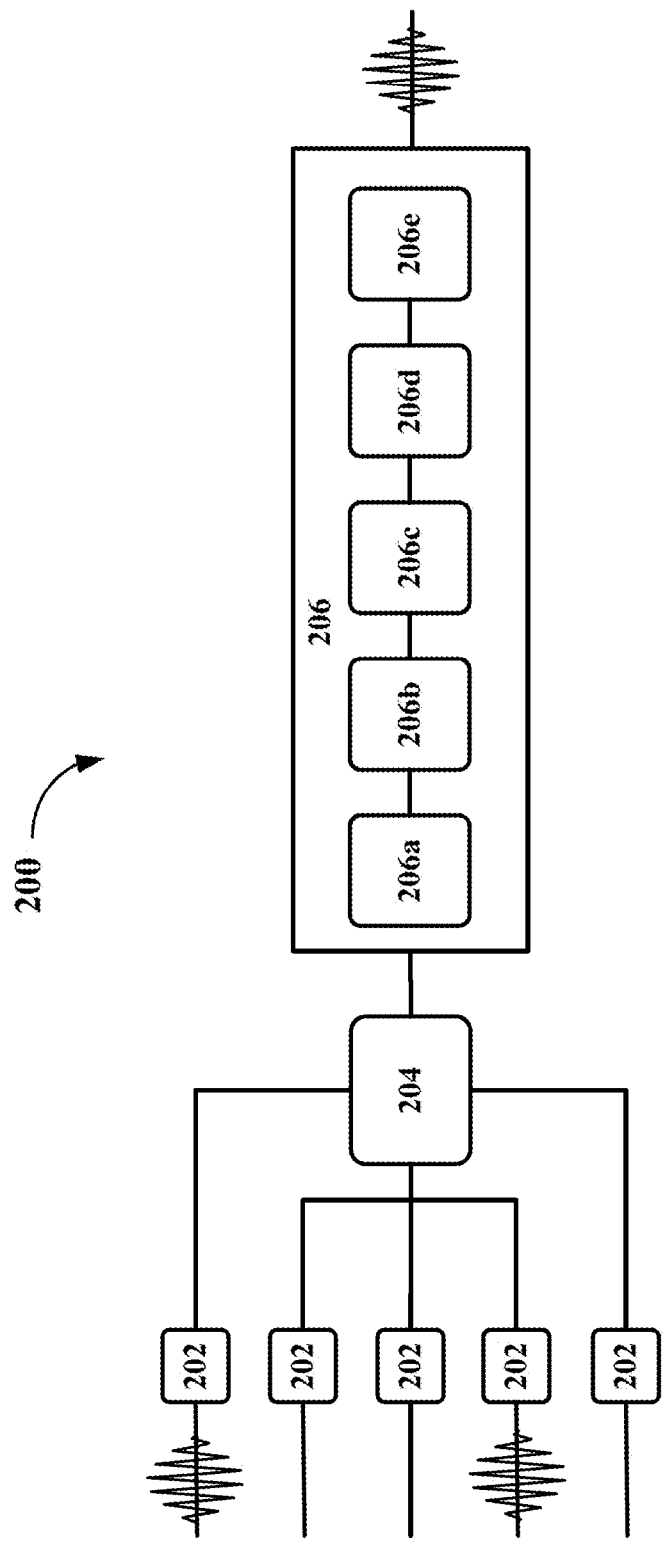
FIG. 2 illustrates an exemplary schematic of an individual neuron.

FIG. 2 illustrates an exemplary schematic of an individual neuron, generally designated as 200. Photons from upstream neurons in superconducting optoelectronic networks are received by superconducting single photon detectors at synapses 202 of a downstream neuron. In one embodiment of the present invention, synapses 202 can be connected in parallel on a single neuron 102. Each of synapses 202 converts photons detected by superconducting single photon detector to an integrated supercurrent that is stored in a loop referred to as synaptic integration loop. Synaptic integration loop includes a superconducting single photon detector in parallel with a Josephson junction circuit for transducing photons to supercurrent and an additional inductive circuit branch for storing a current proportional to the number of photons detected. In some embodiments of the present invention, the inductive circuit branch further includes a resistive circuit. In one embodiment of the present invention, the Josephson junction circuit is a two-junction superconducting quantum interference device. The amount of current that gets added to the synaptic integration loop during a photon detection event is determined by synaptic weight. Synaptic weight refers to the amount of influence the firing of one neuron has on a receiving synapse. The synaptic weight is dynamically adjusted by another circuit combining single photon detectors and Josephson junctions.

Within each neuron, synaptic integration loops of several synapses 202 are inductively coupled to a larger superconducting loop, referred to as neuronal integration loop 204, to induce an integrated current proportional to the current in all its synapses 202. When the current in neuronal integration loop 204 reaches a threshold, neuronal integration loop 204 generates a current pulse in the form of one or more flux quanta to initiate an amplification cascade in a transmitter circuit 206 to further generate a photonic pulse from a waveguide-integrated semiconductor light source. Transmitter circuit 206 includes a thresholding element 206a, an amplifier and reset circuit 206b, a transistor circuit 206c, and a semiconductor light source drive element 206d to drive a light source 206e coupled to an output waveguide (axon).

Figure 3:
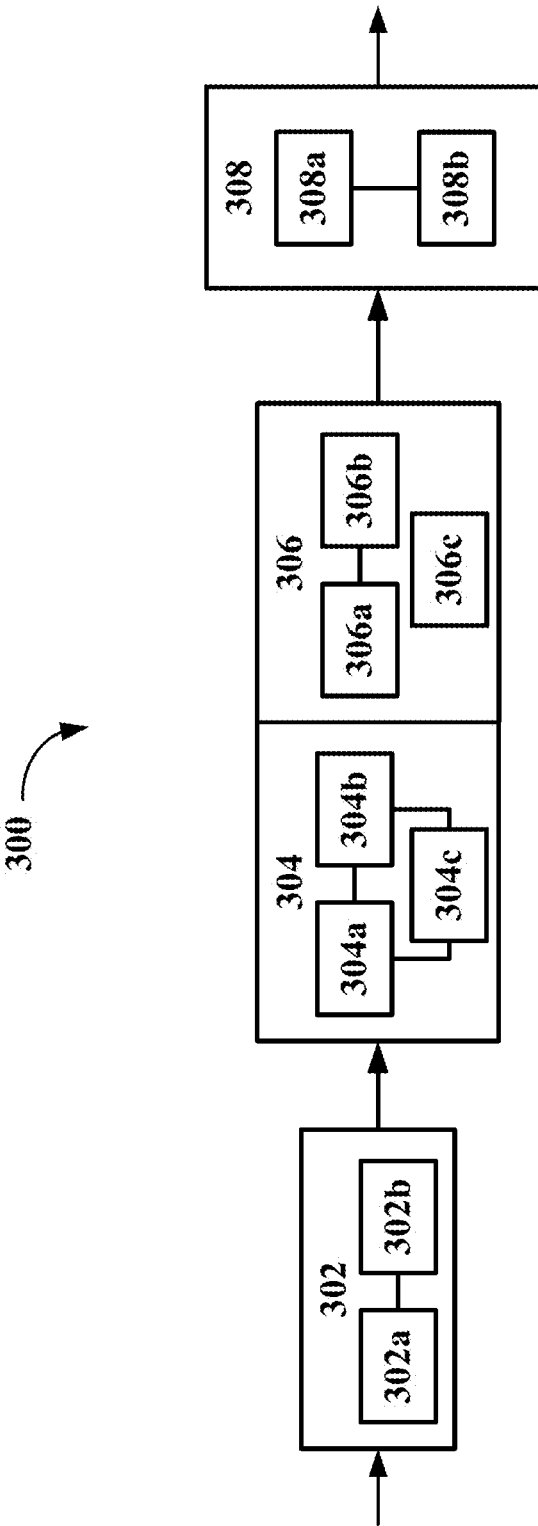
FIG. 3 illustrates a transmitter circuit in accordance with an embodiment of the present invention for amplification of current signals to produce light pulse.

Referring now to the drawings, and more particularly, to FIG. 3, there is shown a transmitter circuit, generally designated 300 and schematically showing an embodiment of the present invention, for receiving a threshold signal from a superconducting optoelectronic neuron when the superconducting element has been driven above a threshold, converting a current pulse to a voltage sufficient to produce light from a semiconductor diode, and resetting to a resting state after light has been generated. Transmitter circuit 300 includes a superconducting thresholding element 302 for detecting whether a neuronal integration loop has reached a threshold value and generating an output current pulse when a threshold current is reached in the neuronal integration loop, a superconducting-semiconducting assembly 304 for converting a current-biased superconducting element into a voltage source, a semiconductor element 306 for converting superconducting-semiconducting assembly 304 voltage source to a second voltage source, and a semiconductor light source drive element 308 driven by superconducting-semiconducting assembly 304. In one embodiment of the present invention, superconducting element is a superconducting wire.

Superconducting thresholding element 302 is positioned in a neuronal integration loop and includes a Josephson junction 302a for adding current, or current pulse, to the neuronal integration loop and a cryotron (Tron) gate element 302b for detecting whether the neuronal integration loop has reached a threshold value. When the current in the neuronal integration loop reaches a threshold value, cryotron gate element 302b switches its state to initiate an amplification sequence. The cryotron gate element can also be brought closer to or further from its threshold value with an additional current bias.

Superconducting-semiconducting assembly 304 includes a cryotron (Tron) switching element 304a having a channel capable of switching between a superconducting state and a resistive state, and a straight or meandering length of superconducting element 304b. In one embodiment of the present invention, superconducting element 304b is a superconducting wire. When the neuronal integration loop reaches a threshold and when cryotron gate element 302b switches its state, an energy pulse is generated in superconducting thresholding element 302 and is transferred from cryotron gate element 302b to the channel of cryotron switching element 304a. The energy pulse transferred from cryotron gate element 302b to the channel of cryotron switching element 304a drives cryotron switching element 304a from the superconducting state to a normal-metal state having finite resistance. In one embodiment of the present invention, cryotron switching element 304a is a heater cryotron (hTron) switching element. In another embodiment of the present invention, cryotron switching element 304a is a nano cryotron (nTron) switching element. Cryotron switching element 304a serves as an interface between superconducting thresholding element 302 and superconducting-semiconducting assembly 304. Energy is released when cryotron switching element 304a is driven from the superconducting state to a normal-metal state, and this energy switches the meandering length of superconducting element 304b from its superconducting state to its normal metal state. The meandering superconducting element 304b becomes resistive in the normal-metal state and a small or bias current across this resistance can generate a voltage sufficient to drive semiconductor transistors 306a and 306b of semiconductor element 306.

In embodiments of the present invention operating in a steady state and using hTron switching element as cryotron switching element 304a, current flows from source to drain through the meander of superconducting element 304b and no current flows through the heating element of hTron switching element. During a switching event, current is injected into hTron gate and heating element. The injected current raises hTron gate element above a critical current, breaking superconductivity and leading to a release of energy in the material that has been driven to the normal state. This energy raises the temperature of meandering superconducting element 304b above a superconductor-to-normal-metal phase transition temperature. The meander becomes resistive when meandering superconducting element switches from its superconducting state to its normal metal state, and a current bias across the resistance results in a voltage. In embodiments in accordance with the present invention, current pulse generated when neuronal integration loop reaches threshold drives hTron from zero-impedance to high impedance. The current pulse through thrown gate dissipates power in a resistive element through Joule heating to produce a temperature shift, which causes hTron to switch to a high-impedance state and causes a length of superconducting element 304b to switch from its superconducting state to its normal metal state. In one exemplary embodiment of the present invention, hTron switches to a state having about 1 MΩ impedance.

A current passing through superconducting element 304b will maintain superconducting element 304b in a normal state until the superconducting element 304b is reset. This phenomenon is called "latching." The latched state can be released using either a passive reset or an active reset. Passive reset can be achieved by diverting the current used to bias the channel of cryotron switching element 304a to an inductor 304c. In one method in accordance with embodiments of the present invention using hTron switching element as cryotron switching element 304a, superconducting element 304b is reset from a latched state with a biasing current to the hTron channel of cryotron switching element 304a. The biasing current is shunted from the hTron channel of cryotron switching element 304a to a passive reset branch 304c. In this method, superconducting-semiconducting assembly 304 temporarily induces a voltage sufficient to switch a transistor 306c or a two-transistor inverter 306a-b in semiconductor element 306 before the current begins flowing through passive reset branch 304c. In an active reset method in accordance with embodiments of the present invention, superconducting element 304b is reset from a latched state by causing cryotron switch element 304a to change the state of transistor 306c or transistors 306a and 306b of semiconductor element 306, and then using semiconductor element 306 to drive light source drive element 308 and to switch off current to the superconductor element 304b to avoid latching. In an active reset method in accordance with an embodiment of the present invention using htron switching element as cryotron switching element 304a, semiconductor transistors 306a and 306b of semiconductor element 306 divert the current temporarily away from hTron channel of cryotron switching element 304a, providing time for the hTron channel to stop producing heat through Joule heating, cool below its superconducting transition temperature, and return to the quiescent, superconducting state. In such circuits, a high-impedance load driven by the superconducting element 304b causes the input voltage to the gate of transistor 306c or two-transistor inverter 306a-b in semiconductor element 306 to drop to zero voltage and switch "OFF." Transistor 306c or two-transistor inverter 306a-b in semiconductor element 306 that is switched "OFF" conduct virtually no current such that the output voltage is equal to the supply voltage.

Semiconductor element 306 separates the superconducting-semiconducting assembly 304 from a light emitting diode (LED) to provide biasing current to the LED that is decoupled from the performance of superconducting thresholding element 302 and superconducting-semiconducting assembly 304. Semiconductor element 306 includes an inverter formed by transistors 306a and 306b (also referred to as two-transistor inverter) or transistor 306c to generate a digital signal capable of driving light source drive element 308 when neuronal threshold is reached and when hTron channel of cryotron switching element 304a switches to a high impedance. In one embodiment of the present invention, each of transistors 306a-c is a field-effect transistor (FET). In an exemplary embodiment of the present invention, each of transistors 306a-c is a metal oxide semiconductor field effect transistor (MOSFET). Transistor 306c or two-transistor inverter 306a-b can control the output of a second sub-circuit that activates light source drive element 308, and then switches off the current to superconducting element 304b for a fixed time period to allow superconducting element 304b to return to superconducting state. Once superconductivity is restored in superconducting element 304b, transistors 306a-c and light source drive element 308 return to their initial state and superconducting element 304b returns to superconducting state.

Figure 4:
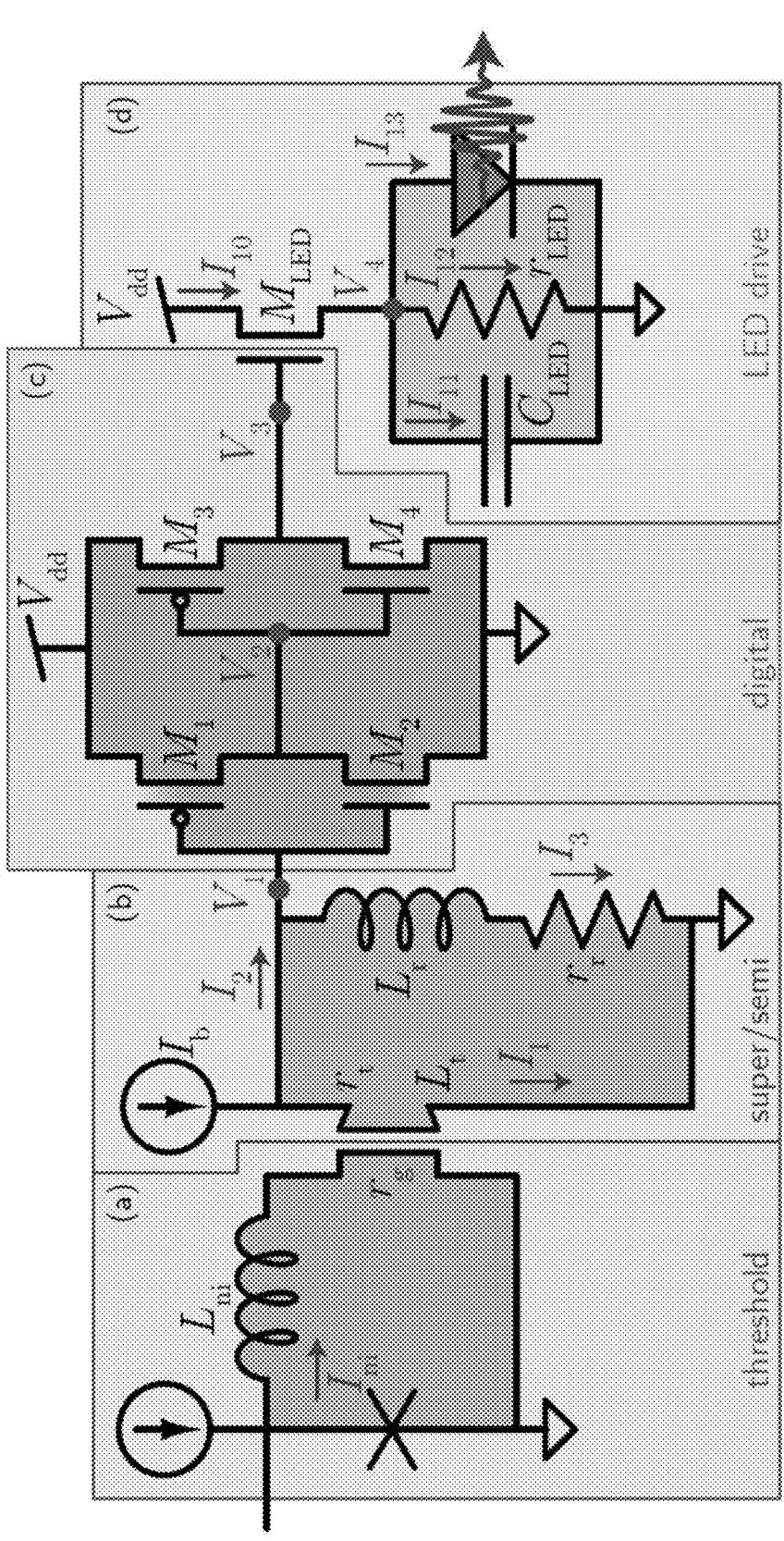
FIG. 4 illustrates an exemplary transmitter circuit with a passive reset configuration in accordance with embodiments of the present invention.

In another embodiment of the present invention, semiconductor element 306 includes two CMOS inverters, as shown in FIG. 4, to produce a digital signal having a voltage amplitude sufficient to drive light source drive element 308. Gate of transistor 306a rise above threshold when the neuronal threshold is reached and the hTron channel of cryotron switching element 304a switches to a high impedance, causing gate of transistor 306b to drop to zero voltage, causing the output of transistor 306b to go to the source-drain supply voltage level (typically referred to as $V_{dd}$ in digital CMOS circuit design) and deliver a substantially constant voltage pulse to light source drive element 308. The role of the CMOS inverters, as shown in FIG. 4, or transistors 306a and 306b is to turn the transient and variable voltage output from the hTron channel of cryotron switching element 304a into a defined and fixed voltage set by the source-drain supply voltage level ($V_{dd}$). This source-drain supply voltage will be input to the gate of transistor 308a that determines the current driven into light source 308b.

Light source drive element 308 is a circuit including a transistor 308a and a light emitting diode (LED) 308b. In one embodiment of the present invention, transistor 308a is a FET. In an exemplary embodiment of the present invention, the FET is a metal oxide semiconductor field effect transistor (MOSFET). A width-to-length ratio and doping level of MOSFET can be set to achieve a predetermined number of photons desired from LED 308b, which is determined based on the number of output synaptic connections to which the neuron must deliver light. Transistor 308a will deliver a pulse of current to LED 308b while superconducting-semiconducting assembly 304 maintains sufficient voltage to keep the gates of transistors 306a and 306b above a threshold. Transistors 306a and 306b are used to ensure transistor 308a is driven with an identical, clean, square-pulse signal to achieve a reliable and predictable light source drive element 308 operation. The current to LED 308b will cease when voltage ($V_{dd}$) drops as the passive reset circuit in superconducting-semiconducting assembly 304 or the active reset circuit in semiconductor element 306 performs its operation. After the voltage to transistors 306a and 306b drops below a threshold value, transistor 308a shuts off, and the voltage across LED 308b block decays with a resistor-capacitor (RC) time constant of light source drive element 308 circuit. In one embodiment of the present invention, resistance and capacitance of LED 308b is set such that RC time constant is about 100 ns.

Figure 5:
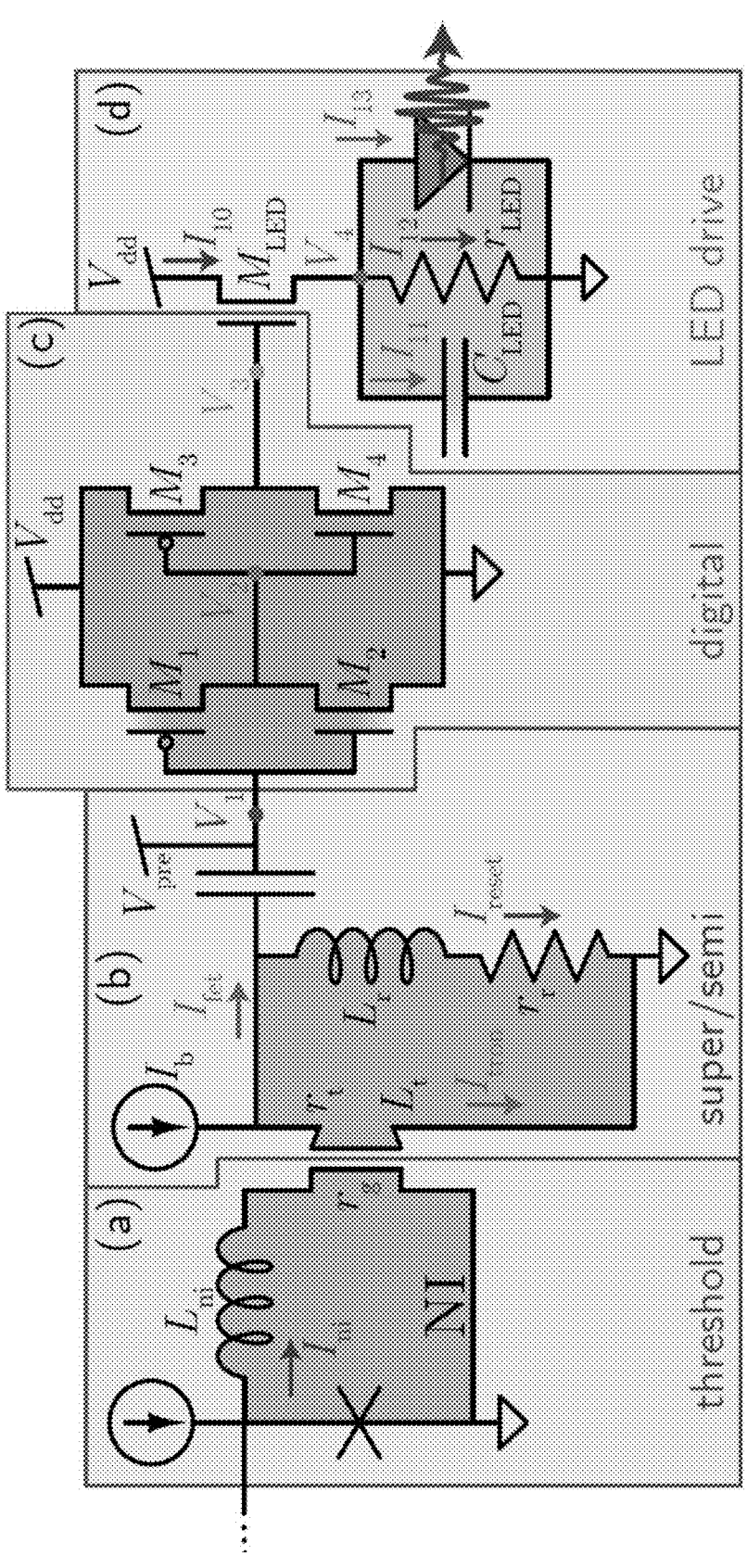
FIG. 5 illustrates an exemplary transmitter circuit with an alternate passive reset configuration in accordance with embodiments of the present invention.

FIG. 4 illustrates an exemplary implementation of transmitter circuit 300 in accordance with embodiments of the present invention with a passive reset configuration. Signal moves from left to right during typical operation of transmitter circuit shown in FIG. 4. Photons received by superconducting single photon detectors at synapses of a downstream neuron convert the detection signals to an integrated supercurrent that is stored in a loop referred to as synaptic integration loop. Loops of several synapses within a neuron activate the Josephson junction in the thresholding loop to add current to the neuronal integration loop with inductance $L_i$. Josephson junction adds current to the neuronal integration loop until the current ($I_{ni}$) in the neuronal integration loop reaches a threshold value and drives hTron gate from zero-impedance to high impedance. When the current $I_{ni}$ is below the hTron gate threshold, the resistance ($r_g$) of the hTron gate (FIG. 4(a)) is zero, as this component is superconducting. When the current $I_{ni}$ exceeds the hTron gate threshold, that circuit element switches from superconducting to normal, and the resistance $r_g$ switches to a finite value. In one embodiment of the present invention, resistance $r_g$ switches to a value on the order of 1 kΩ. The energy that was stored in the inductor $L_{ni}$ is $L_{ni} I_{ni}^2/2$. This energy is then dissipated in an amount of time set by the $L_{ni}/r_g$ time constant. When this energy is dissipated, it switches the hTron channel ($r_t$) in FIG. 4(b). In one embodiment, resistance $r_t$ switches from zero ohms in the superconducting state to about 1 MΩ in the resistive state. The current $I_b$ is then diverted from $I_1$ to $I_2$, producing a voltage at node $V_1$ due to the time derivative of a current $I_3$ across the inductor $L_r$. In another embodiment of the present invention, as shown in FIG. 5, superconducting thresholding element (hTron, a thin-film amplifier) is coupled to the CMOS inverter ($M_1$ and $M_2$) through a capacitor. This configuration is referred to as an AC-coupled configuration. A voltage bias ($V_{pre}$) can then be applied to bring the inverter ($M_1$ and $M_2$) close to its threshold. In this configuration, hTron only needs to add a small amount of additional voltage. Voltage ($V_1$)

switches the first inverter stage ($M_1$ and $M_2$, FIG. 4(c)), which then switches the second inverter stage ($M_3$ and $M_4$), producing a high voltage ($V_{dd}$) at node $V_3$. This voltage turns on MOSFET ($M_{LED}$), which passes current $I_{10}$ to the LED stage (FIG. 4(d)). The role of the inverters (formed by $M_1$, $M_2$, $M_3$ and $M_4$) is to produce a clean, stable voltage ($V_{dd}$) to drive the current source MOSFET ($M_{LED}$) to the LED. This provides consistent biasing current to the LED that is decoupled from the performance of the thresholding element. The inverters (formed by $M_1$, $M_2$, $M_3$ and $M_4$) also isolate the superconducting components from the remaining semiconducting components. A width-to-length ratio and doping level of MOSFET ($M_{LED}$) can be selected based on a predetermined number of photons desired from the LED, which is determined based on the number of synaptic connections made by the neuron. MOSFET ($M_{LED}$) will deliver a pulse of current ($I_{13}$) to the LED while the hTron maintains voltage ($V_1$). The current ($I_{13}$) to the LED will cease when voltage ($V_1$) drops as the passive reset circuit ($L_r$-$r_r$) performs its operation.

Figure 6:
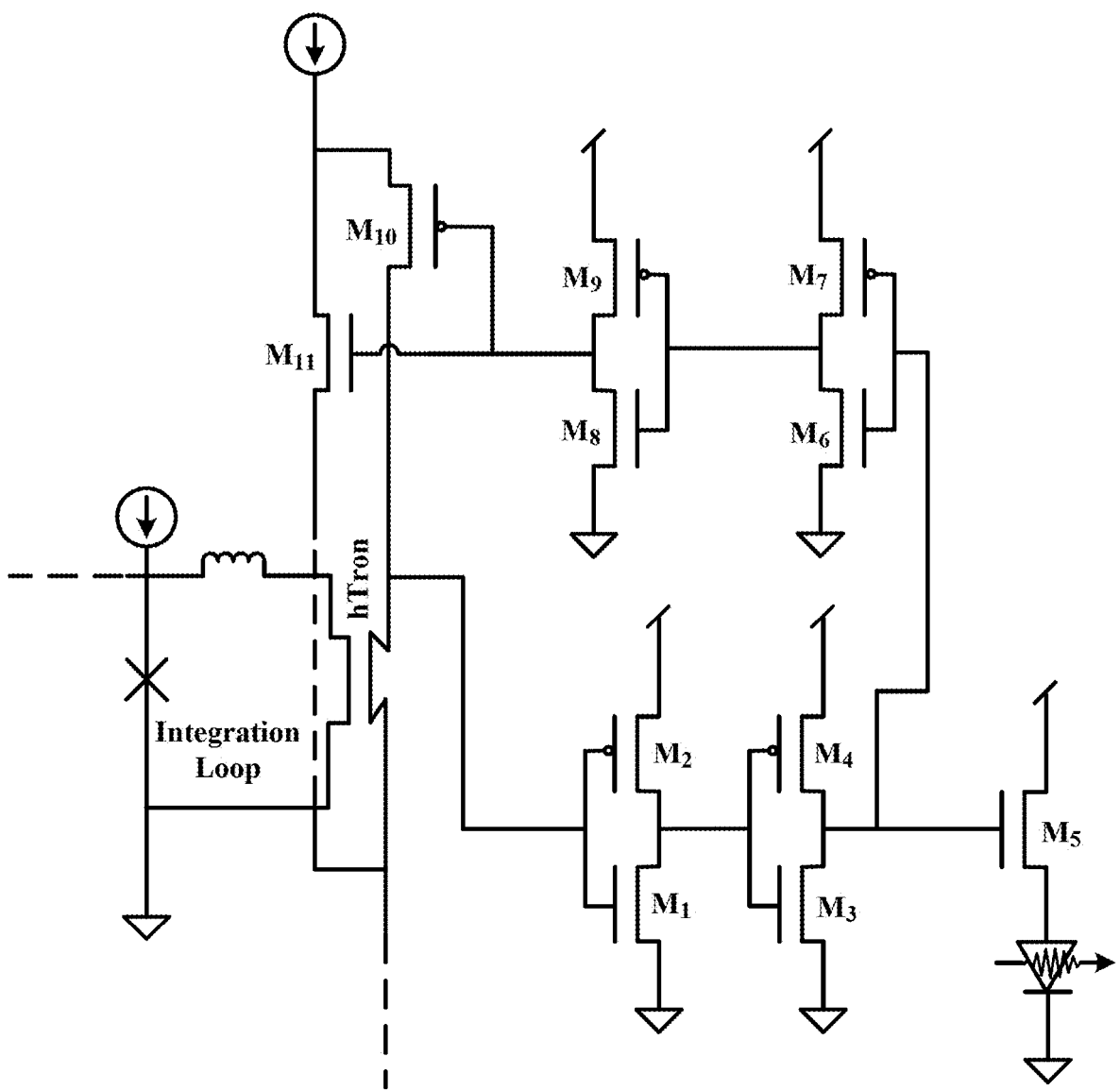
FIG. 6 illustrates an exemplary transmitter circuit with an active reset configuration in accordance with embodiments of the present invention.

FIG. 6 illustrates an exemplary implementation of transmitter circuit 300 in accordance with embodiments of the present invention with an active reset configuration. The circuit initially operates in the same manner as the passive reset circuit. When the current in the integration loop reaches a threshold set by the gate of the hTron, the hTron switches to a high-impedance state and the voltage across the hTron rises to a high voltage. This high voltage across the hTron first switches the inverter formed by $M_1$ and $M_2$, and then switches the inverter formed by $M_3$ and $M_4$, to produce a high voltage at a node to the gate of $M_5$ and drive a current through the LED. The node at the gate of $M_5$ is the same as the node for gates of $M_6$ and $M_7$. The high voltage produced at the node at the gate of $M_5$ switches the inverter formed by $M_6$ and $M_7$, which then switches inverter formed by $M_8$ and $M_9$ to produce a high voltage at the node for inverter formed by $M_{10}$ and $M_{11}$. In the quiescent state, the current bias to $M_{10}$ and $M_{11}$ flows through pmos $M_{10}$ and through the channel of the hTron. When the voltage to the gates of $M_{10}$ and $M_{11}$ is high, pmos $M_{10}$ closes and nmos $M_{11}$ opens to divert the current around the hTron. This allows the channel of the hTron to quickly recover with no joule heating. Once the current is diverted away from the hTron channel, the voltage to $M_1$ and $M_2$ drops to a lower value, and all inverters reset to the quiescent state. The voltage to $M_5$ gate must stay at the high value long enough to deliver the desired current through $M_5$ to the LED to produce the desired light pulse, and the states of $M_{10}$ and $M_{11}$ must be switched long enough such that the hTron channel has time to return to the superconducting state. Time constants required to maintain high voltage to $M_5$ gate and to maintain $M_{10}$ and $M_{11}$ in a switched state can be accomplished by the inclusion of inductors, capacitors, and resistors to provide RC and L/R times, as well as by making use of the intrinsic delays, resistances, and capacitances of the MOSFETs.

MOSFET ($M_{LED}$) behavior can be simulated using a charge-control model with current-voltage characteristics given by $$I_{ds}(V_{ds}, V_{gs}) = \frac{W\mu_n c_i}{L} \times \begin{cases} (V_{gs} - V_{ds}/2)V_{ds}, & \text{for } V_{ds} \le V_{sat} \\ V_{gt}^2/2, & \text{for } V_{ds} > V_{sat} \end{cases} \quad (1)$$

$V_{gt}$ is the voltage above threshold: $V_{gt}=V_{gs}-V_r$. Sub-threshold behavior can be ignored by assuming that the drain-source current is zero for $V_{gs}<V_r$. In this model, $V_{sat}=V_{gt}$.

LED used in embodiments of the present invention can be a conventional diode represented by the following equation.

$$I_{LED} = eA\left[(D_p/L_p)p_n + (D_n/L_n)n_p\right] \times \left[e^{eV/k_BT} - 1\right] \qquad (2)$$

wherein A is the area of the p-n junction forming the LED through which current will pass, $D_p$ is the diffusion constant for holes, $L_p$ the diffusion length for holes, $p_n$ the concentration of holes on the n side of the junction, $D_n$, $L_n$, $n_p$ are analogous quantities for the p side of the junction, and T is the temperature.

Light source used in embodiments in accordance with the present invention can be selected from multiple classes of LEDs. In one embodiment of the present invention, LED can be based on silicon emissive centers or strained silicon that possess unique process compatibility and feasibility for enabling low-cost manufacturing of large systems. In another embodiment of the present invention, LED can be based on Groups III-V quantum dots. Exemplary LEDs based on Groups III-V quantum dots include InGaAs quantum dots on a GaAs platform, and the like. LEDs based on Groups III-V quantum dots have high quantum efficiency and emission lifetime of about 1 ns. In an alternative embodiment of the present invention, LED can be Ge nanocrystals embedded in silicon. LEDs based on Ge nanocrystals embedded in silicon provide high efficiency, short lifetime, and process compatibility with silicon microelectronics at the 300 mm wafer scale.

LED circuits used in embodiments in accordance with the present invention, and represented by Equation 2, can be formed by a p-i-n diode. In one embodiment of the present invention, LED circuits is formed by positioning a MOSFET in series with a capacitance and resistance positioned in parallel, as shown in FIG. 4. In another embodiment of the present invention, LED circuit is formed by positioning a MOSFET in series with a resistance.

Light source used in an embodiment in accordance with the present invention include at least one emitter having a predetermined density $\rho_{ec}$ of emissive centers to each generate a photon per neuronal firing pulse. In another embodiment, light source is a bulk emitter having a density of states of the semiconductor band structure. The predetermined value of capacitance will depend on the number of emitters in a given area of light source. The number of emitters will in turn depend on the number of synaptic connections made by the neuron. Embodiments in accordance with the present invention will utilize two values of capacitance per unit area ($C_a=1\times10^{-7}$ F/$\mu^2$ and $C_a=1\times10^{-5}$ F/$\mu^2$) to cover a range of values that may be found in various devices. The value of capacitor ($C_{LED}$) is determined by $C_{LED}=C_a*N_{ph}/\rho_{ec}$, wherein $\rho_{ec}$ is specified as number of emitters per unit area and $N_{ph}$ is the number of photons the LED is designed to create per firing event.

Time domain transmitter circuits can be represented by the following equations using $I_{ds}$ and $I_{LED}$ obtained from equations 1 and 2.

$$\frac{dV_1}{dt} = \frac{I_b - I_1 - I_3}{C_I}, \qquad (3)$$

$$\frac{dV_2}{dt} = \frac{-1}{C_I}[I_p(V_2 - V_{dd}, V_1 - V_{dd}) + I_n(V_2, V_1)],$$

$$\frac{dV_3}{dt} = \frac{-1}{C_D}[I_p(V_3 - V_{dd}, V_2 - V_{dd}) + I_n(V_3, V_2)],$$

$$\frac{dV_4}{dt} = \frac{1}{C_{LED}}\left[I_n(V_{dd2} - V_4, V_3) - I_{LED}(V_4) - \frac{V_4}{r_{LED}}\right],$$

$$\frac{d^2I_1}{dt^2} = \frac{I_b - I_1 - I_3}{L_tC_I} - \frac{r_t}{L_t}I_1 - \frac{r_tI_1}{L_t}\frac{dI_1}{dt},$$

$$\frac{dI_3}{dt} = \frac{r_t}{L_r}I_1 + \frac{L_t}{L_r}\frac{dI_1}{dt} - \frac{r_r}{L_r}I_3$$

wherein $I_p(V_{ds}, V_{gs})$ and $I_n(V_{ds}, V_{gs})$ represent current flows from source to drain in a PMOS and drain to source in a NMOS, $C_I$ is the capacitance of an inverter, and $C_D$ is the capacitance of the MOSFET driver to the LED.

Reference now to the specific examples which follow will provide a clearer understanding of systems in accordance with embodiments of the present invention. The examples should not be construed as a limitation upon the scope of the present invention.

Figure 7:
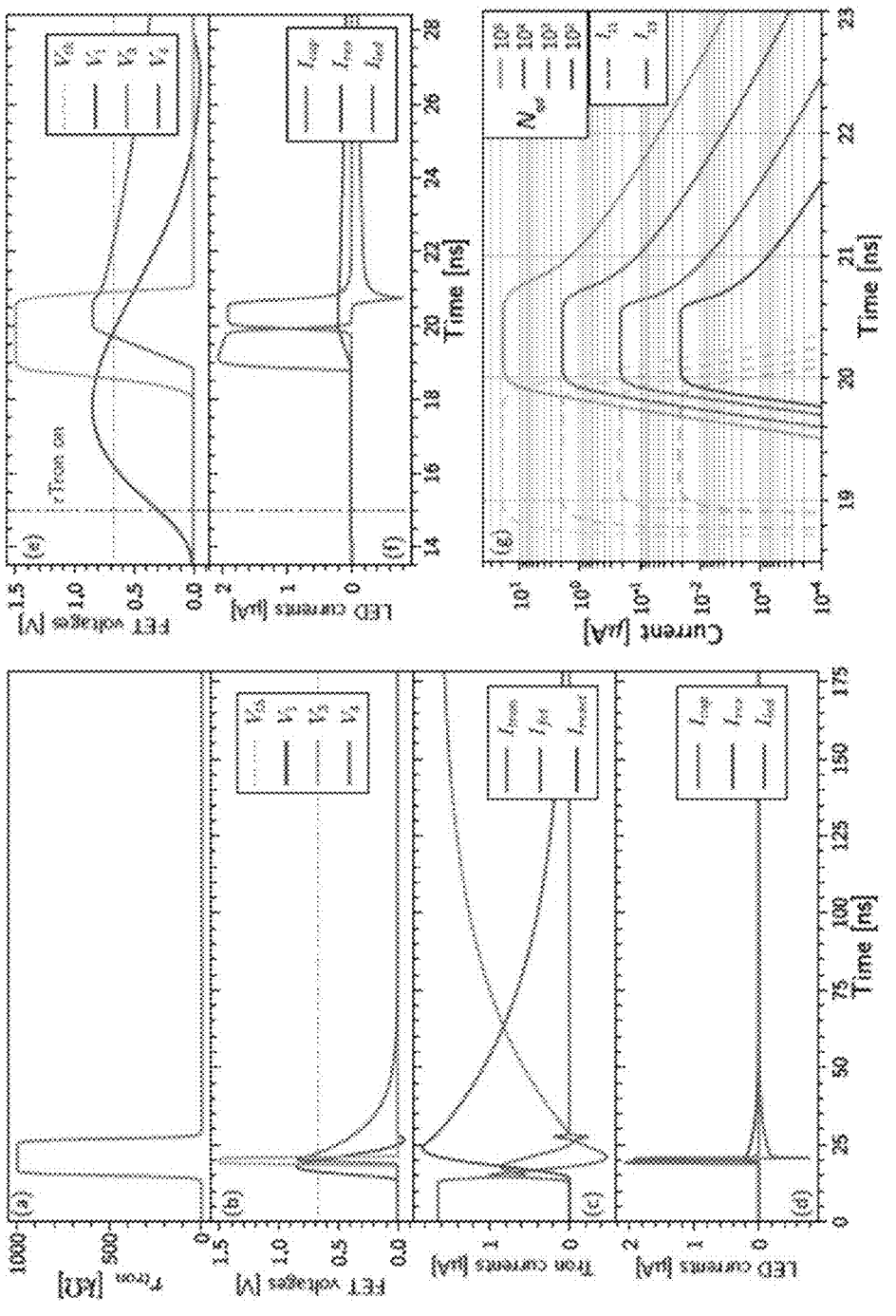
FIG. 7 illustrates data from exemplary time domain simulations of a transmitter circuit in accordance with an embodiment of the present invention.

FIG. 7 illustrates results of exemplary time domain simulations of a transmitter circuit model, as represented by Equations 3. FIG. 7(a) illustrates the resistance pulse ($r_{tron}$) of the hTron and FIG. 7(b) shows the corresponding FET voltages for the exemplary transmitter circuit. FIG. 7(e) illustrates a temporal scale enlargement of the plots shown in FIGS. 7(a) and (b). The MOSFET threshold is shown by a horizontal dotted line in FIGS. 7(b) and (e). The gates of the first inverter stage quickly rise above threshold, and a nearly ideal square pulse is delivered to the gate of MOSFET ($M_{LED}$) driver to the light source. It is for this reason that the two-inverter digital circuit is employed. Driving the LED with this clean, square pulse will ensure repeatable circuit behavior that is straightforward to design in a manner that will generate the desired number of output photons with each pulse. After the voltage to the first inverter drops below threshold, $M_{LED}$ quickly shuts off, and the voltage across the LED block decays with the RC time constant of that circuit.

The corresponding currents in htron ($I_{tron}$), MOSFET ($I_{fet}$), and in reset circuit ($I_{reset}$) are shown in FIG. 7(d) and currents in the LED capacitance ($I_{cap}$), LED drive resistance ($I_{res}$), and LED ($I_{LED}$) are shown in FIG. 7(f). The hTron currents shown in FIG. 7(c) illustrate that the current through the tron channel is quickly diverted to the gates of the MOSFETs long enough to switch the inverters, after which the current is diverted to the L-r branch of transmitter circuit for passive reset. On the same timescale shown in FIG. 7(c), the LED currents ($I_{cap}$, $I_{res}$, and $I_{LED}$) appear to be short-lived, as are shown in FIG. 7(f), and deliver only a short pulse of current to the source to maintain high efficiency without over-injecting. FIG. 7(f) further illustrates that the current the two-inverter digital circuit delivers to the LED is a nearly ideal square pulse having 1 ns duration. The hTron switches to the resistive state at 15 ns (shown by vertical dotted line in FIG. 7(f)), and the total delay of the circuit from the time of the resistance to the time that current begins to enter the diode is 5 ns, with delays accrued due to charge accumulations at the MOSFET and LED capacitances. The MOSFET model used herein assumes a 1 μm minimum feature size and shorter delays are achievable with the reduced capacitance of advanced CMOS.

In the exemplary time domain simulations of a transmitter circuit model, current injection required to populate a predetermined number of quantum dots or emissive centers ($N_{qd}$) was determined by iterating the width-to-length ratio of MOSFET ($M_{LED}$) and the channel doping of that MOSFET.

For each value of $N_{qd}$, the area of the diode was calculated based on the density of emitters, and using this area of the diode, the capacitance was approximated using a parallel-plate model. The capacitance increases linearly with the number of photons required from the source. FIG. 7(g) shows currents in the LED on a fine temporal scale along the x-axis and a logarithmic y-axis for four values of the number of emitters from about $10^2$ to $10^5$, which covers a broad range of neuron types with varying degree of connectivity. The dashed curves at earlier time scale in the plot correspond to the current $I_{11}$ (shown in FIG. 4) being driven into the LED capacitance and the solid traces at later time scale correspond to current $I_{13}$ (shown in FIG. 4) that injects current into the active region of the LED. FIG. 7(g) shows that in all cases current must be delivered to the capacitor to bring the voltage across the LED above threshold before current is driven into the diode itself. This results in approximately 1 ns of additional delay beyond the MOSFET stages.

Neuromimetic circuits including transmitter circuit in accordance with embodiments of the present invention has several advantages over previous neuromimetic circuits. Josephson junctions are powerful circuit elements for neuromorphic computation, but they cannot communicate signals to many destinations or over long distances. The circuit described herein enables outputs from neuromimetic circuits to drive a light source, which can signal to many destinations that may be far away. The use of a hTron to threshold on a current produced by a Josephson junction and to output a voltage capable of driving a semiconductor circuit allows the computation of the Josephson circuits to be communicated optically. However, the hTron by itself is not ideal for driving the light source, as the hTron output voltage is not clean, and the circuit latches in typical operation. Instead, using the hTron to drive MOSFET circuitry enables a clean drive to the LED and reset of the hTron itself. Thus, by combining the Josephson junction, hTron, MOSFETs, and the LED, all desired aspects of computation, thresholding, light-source drive, and reset can be accomplished. The circuit is sufficiently fast for neural spiking operation, consumes acceptably low power, and is feasible to manufacture. Further, all components operate at 4K.

Neuromimetic circuits including transmitter circuit in accordance with one or more embodiments of the present invention can be adapted to a variety of configurations. It is thought that neuromimetic circuits in accordance with various embodiments of the present invention and many of its attendant advantages will be understood from the foregoing description and it will be apparent that various changes may be made without departing from the spirit and scope of the invention or sacrificing all of its material advantages, the form hereinbefore described being merely a preferred or exemplary embodiment thereof.

Those familiar with the art will understand that embodiments of the invention may be employed, for various specific purposes, without departing from the essential substance thereof. The description of any one embodiment given above is intended to illustrate an example rather than to limit the invention. This above description is not intended to indicate that any one embodiment is necessarily preferred over any other one for all purposes, or to limit the scope of the invention by describing any such embodiment, which invention scope is intended to be determined by the claims, properly construed, including all subject matter encompassed by the doctrine of equivalents as properly applied to the claims.

What is claimed is:

1. A neuromimetic circuit comprising:
a neuronal integration loop comprising a plurality of synaptic integration loops, wherein the plurality of the synaptic integration loops comprises a combined plurality of electrical signals generated during a plurality of synaptic firing events in a plurality of synapses, wherein the neuronal integration loop induces an integrated current pulse;
a transmitter circuit for generating a photonic pulse, wherein the transmitter circuit comprises:
a superconducting thresholding element for detecting a threshold value of the induced integrated current pulse in the neuronal integration loop, wherein the superconducting thresholding element generates a first current pulse at the threshold value of the integrated current pulse;
superconducting-semiconducting assembly for switching a superconducting element from a superconducting state to a normal metal state, wherein a first biasing current through the switched superconducting element in the normal metal state induces a first voltage;
a semiconductor element comprising a plurality of transistors for inducing a second voltage, wherein the first voltage induced by the switched superconducting element switches off at least one of the plurality of the transistors, wherein the switched off at least one of the plurality of the transistors induces the second voltage;
a semiconductor light source drive element to drive a light source to generate the photonic pulse, wherein the induced second voltage from the switched off at least one of the plurality of the transistors drives the semiconductor light source drive element,
wherein the neuronal integration loop generating the integrated current pulse initiates an amplification cascade in the transmitter circuit.

2. The neuromimetic circuit of claim 1, wherein the superconducting thresholding element further comprises a Josephson junction for adding current to the neuronal integration loop until the integrated current pulse reaches the threshold value.

3. The neuromimetic circuit of claim 1, wherein the superconducting-semiconducting assembly comprises a cryotron switching element for switching the superconducting element from the superconducting state to the normal metal state, wherein the superconducting element is resistive in the normal metal state, wherein the resistive superconducting element generates a voltage to drive the light source drive element, wherein the first current pulse generated in the superconducting thresholding element switches the cryotron switching element to the normal metal state.

4. The neuromimetic circuit of claim 3, wherein the cryotron switching element is a heater cryotron (hTron) switching element.

5. The neuromimetic circuit of claim 3, wherein the cryotron switching element is a nano cryotron (nTron) switching element.

6. The neuromimetic circuit of claim 1, further comprising a reset element for receiving a first portion of the first biasing current to reset the superconducting element to the superconducting state.

7. The neuromimetic circuit of claim 6, wherein the reset element is a passive reset element.

8. The neuromimetic circuit of claim 6, wherein the reset element is an active reset element.

9. The neuromimetic circuit of claim 6, further comprising a capacitor for receiving a second portion of the first biasing current, wherein a second biasing current through the switched superconducting element in the normal metal state induces the first voltage.

10. The neuromimetic circuit of claim 1, wherein the superconducting element is a superconducting wire.

11. The neuromimetic circuit of claim 1, wherein the plurality of the first transistors are metal oxide semiconductor field effect transistors.

12. The neuromimetic circuit of claim 1, wherein the plurality of the first transistors are complementary metal-oxide semiconductor (CMOS) transistors.

13. The neuromimetic circuit of claim 1, wherein the semiconductor light source drive element comprises:
a second transistor for receiving the second voltage and generating a second current pulse; and
a light emitting diode for generating the photonic pulse, wherein the semiconductor light source receives the second current pulse to generate the photonic pulse.

14. The neuromimetic circuit of claim 1, wherein the semiconductor light source is a light emitting diode.

15. A neuromimetic circuit comprising:
a neuronal integration loop comprising a plurality of synaptic integration loops, wherein the plurality of the synaptic integration loops comprises a combined plurality of electrical signals generated during a plurality of synaptic firing events in a plurality of synapses, wherein the neuronal integration loop induces an integrated current pulse;
a transmitter circuit for generating a photonic pulse, wherein the transmitter circuit comprises:
a Josephson junction for adding a first current pulse to the neuronal integration loop until the integrated current pulse reaches a threshold value;
a cryotron gate element for detecting a threshold value of the induced integrated current pulse in the neuronal integration loop, wherein the cryotron gate element generates a second current pulse at the threshold value of the integrated current pulse;
a cryotron switching element comprising a channel for receiving the second current pulse, wherein the receiving the second current pulse switches the cryotron switching element from a superconducting state to a first resistive state;
a superconducting element for conducting a first biasing current, wherein the switched cryotron switching element in the first resistive state switches the superconducting element to a second resistive state, wherein conducting the first biasing current through the switched superconducting element in the second resistive state induces a first voltage;
a semiconductor element comprising a plurality of transistors for inducing a second voltage, wherein the first voltage induced by the switched superconducting element switches off at least one of the plurality of transistors, wherein the switched off at least one of the plurality of transistors induces the second voltage;
a semiconductor light source drive element for receiving the second voltage to generate a second current pulse, wherein the second current pulse drives a light source to generate the photonic pulse; and a reset element for receiving a first portion of the first biasing current to reset the superconducting element to the superconducting state,
wherein the neuronal integration loop generating the integrated current pulse initiates an amplification cascade in the transmitter circuit.

16. The neuromimetic circuit of claim 15, further comprising a capacitor for receiving a second portion of the first biasing current, wherein a second biasing current through the switched superconducting element in the normal metal state induces the first voltage.

17. The neuromimetic circuit of claim 15, wherein the cryotron switching element is a heater cryotron (hTron) switching element.

18. The neuromimetic circuit of claim 15, wherein the cryotron switching element is a nano cryotron (nTron) switching element.

19. The neuromimetic circuit of claim 15, wherein the superconducting element is a superconducting wire.

20. The neuromimetic circuit of claim 15, wherein the plurality of transistors are complementary metal-oxide semiconductor (CMOS) transistors.

21. The neuromimetic circuit of claim 15, wherein the light source is a light emitting diode.

22. A neuromimetic circuit comprising:
a neuronal integration loop comprising a plurality of synaptic integration loops, wherein the plurality of the synaptic integration loops comprises a combined plurality of electrical signals generated during a plurality of synaptic firing events in a plurality of synapses, wherein the neuronal integration loop induces an integrated current pulse;
a transmitter circuit for generating a photonic pulse, wherein the transmitter circuit comprises:
a Josephson junction for adding a first current pulse to the neuronal integration loop until the integrated current pulse reaches a threshold value;
a heater cryotron gate element for detecting the threshold value of the induced integrated current pulse in the neuronal integration loop, wherein the heater cryotron gate element generates a second current pulse at the threshold value of the integrated current pulse;
a cryotron switching element comprising a heater cryotron channel for receiving the second current pulse, wherein receiving the second current pulse switches the cryotron switching element from a superconducting state to a first resistive state;
a superconducting element for conducting a first biasing current, wherein the switched cryotron switching element in the first resistive state switches the superconducting element to a second resistive state, wherein conducting the first biasing current through the switched superconducting element in the second resistive state induces a first voltage;
a semiconductor element comprising a first transistor and a second transistor for inducing a second voltage, wherein the first voltage induced by the switched superconducting element switches off the first and the second transistors, wherein the switched off the first and the second transistors induce the second voltage;
a third transistor for receiving the second voltage and generating a third current pulse; and
a light emitting diode for receiving the third current pulse and generating the photonic pulse, wherein the neuronal integration loop generating the integrated current pulse initiates an amplification cascade in the transmitter circuit.

23. The neuromimetic circuit of claim 22, further comprising a reset element for receiving a first portion of the first biasing current to reset the superconducting element to the superconducting state.

24. The neuromimetic circuit of claim 23, further comprising a capacitor for receiving a second portion of the first biasing current, wherein a second biasing current through the switched superconducting element in the normal metal state induces the first voltage.

25. The neuromimetic circuit of claim 22, wherein the superconducting element is a superconducting wire.

26. The neuromimetic circuit of claim 22, wherein the first, the second and the third transistors are complementary metal-oxide semiconductor (CMOS) transistors.

27. The neuromimetic circuit of claim 22, wherein the switched cryotron switching element in the first resistive state has an impedance of about 1 M$\Omega$.

* * * * *